(12) United States Patent
Gutierrez et al.

(10) Patent No.: US 9,943,778 B1
(45) Date of Patent: Apr. 17, 2018

(54) AIR CONDITIONING CONDENSATE TREATMENT SYSTEM

(71) Applicants: John Gutierrez, Mandeville, LA (US); Aamar Quershi, Katy, TX (US)

(72) Inventors: John Gutierrez, Mandeville, LA (US); Aamar Quershi, Katy, TX (US)

( * ) Notice: Subject to any disclaimer, the term of this patent is extended or adjusted under 35 U.S.C. 154(b) by 209 days.

(21) Appl. No.: 14/560,469

(22) Filed: Dec. 4, 2014

(51) Int. Cl.
*F24F 13/22* (2006.01)
*B01D 5/00* (2006.01)

(52) U.S. Cl.
CPC ............ *B01D 5/009* (2013.01); *F24F 13/222* (2013.01); *F24F 2013/227* (2013.01); *F24F 2013/228* (2013.01); *F24F 2110/10* (2018.01); *F24F 2110/20* (2018.01); *F24F 2110/40* (2018.01)

(58) Field of Classification Search
CPC .. F24F 13/222; F24F 2110/10; F24F 2110/20; F24F 2110/40; F24F 2013/227; F24F 2013/228; F28F 17/005; F28F 2265/20; C02F 1/688
See application file for complete search history.

(56) References Cited

U.S. PATENT DOCUMENTS

| | | | |
|---|---|---|---|
| 5,402,813 A | 4/1995 | Keen | |
| 6,294,086 B1* | 9/2001 | Reeves | B01F 1/0027 210/198.1 |
| 6,584,995 B2 | 7/2003 | Kimbrough et al. | |
| 6,651,690 B1 | 11/2003 | Coogle | |
| 7,191,606 B1 | 3/2007 | Dwyer | |
| 7,686,034 B1 | 3/2010 | Coogle | |
| 7,740,025 B2 | 6/2010 | Scaringe | |
| 7,740,027 B1 | 6/2010 | Coogle | |
| 7,930,898 B2 | 4/2011 | Laufenberg et al. | |
| 8,475,603 B2 | 7/2013 | Kaiser | |
| 8,683,821 B2* | 4/2014 | Volk | B01D 29/15 62/291 |
| 2012/0325333 A1 | 12/2012 | Athanasiou | |
| 2014/0075967 A1 | 3/2014 | Arensmeier et al. | |
| 2015/0041550 A1* | 2/2015 | Honda | F24F 11/0012 236/51 |

* cited by examiner

Primary Examiner — Terry K Cecil
(74) Attorney, Agent, or Firm — Kenneth L. Tolar

(57) ABSTRACT

A condensate treatment system includes a housing attached to an A/C condensate drain line having a biocide received within an interior chamber. A load cell continuously measures the weight of biocide in the interior chamber in order to calculate a remaining amount. A control unit is in communication with the load cell and various sensors for monitoring operational variables associated with the condensate system. The control unit has Wi-Fi capability to allow the sensor readings and the remaining amount of biocide to be accessed wirelessly from a supervisor's remote computer or smart phone. If the control unit detects rising condensate levels in the drip pan or the housing, it disables the air conditioner to prevent an overflow.

12 Claims, 4 Drawing Sheets

AIR CONDITIONING CONDENSATE TREATMENT SYSTEM

CROSS REFERENCE TO RELATED APPLICATIONS

None.

BACKGROUND OF THE INVENTION

The present invention relates to a treatment system that disinfects condensate effluent in an air conditioning system while allowing a remote supervisor to wirelessly access various operational data.

DESCRIPTION OF THE PRIOR ART

A typical air conditioning system includes an air handler where warm incoming air is cooled by a refrigerant and returned to a building interior. As the air is cooled, entrained water vapor condenses and falls onto an underlying drip pan. A drain line connected to the drip pan discharges the accumulated condensate into a municipal sewer system. However, the warm condensate is an ideal environment for microbiological organisms, which can multiply, plug the drain line and overflow the drip pan. Overflowing condensate can severely damage a building and its contents, particularly if not immediately discovered and corrected.

Due to the major problems posed by overflowing condensate, some condensate drain lines are equipped with special blowout fittings that allow a user to connect a compressed air source to dislodge accumulated debris. However, because a homeowner or building supervisor is usually unaware if and when an overflow condition is developing, the line must be cleared regularly to minimize any risk of catastrophic damage. Regularly cleaning a condensate line with a compressed air source is burdensome for a homeowner and consumes costly manpower for a commercial building owner.

Accordingly, there is currently a need for a device that automatically controls biological growth in a condensate effluent system. A review of the prior art reveals various devices for introducing bleach or compressed air into a condensate drain line to prevent or eliminate plugging. For example, U.S. Pat. No. 5,402,813 issued to Keen discloses an inline algicide dispenser for an air-conditioner condensate drain line.

U.S. Pat. No. 6,584,995 issued to Kimbrough et al. discloses a valve that is coupled with an A/C condensate drain line having a pair of ports thereon to allow compressed air or bleach to be easily injected into the condensate line to eliminate microbial growth.

U.S. Pat. No. 6,651,690 issued to Coogle discloses a vertical pipe having a pair of tube sections extending therefrom for coupling with an AC condensate line. The vertical pipe includes a removable cap that exposes an opening for depositing biocides therein.

U.S. Pat. No. 7,191,606 issued to Dwyer discloses a drain-trap alarm for an HVAC system that alerts a user when the trap is dry and, therefore, vulnerable to sewer gas intrusion.

U.S. Pat. No. 6,651,690 issued to Coogle discloses a condensate treatment module for an A/C system comprising an elongated, tubular body that is coupled with a condensate drain line. The body includes a receptacle that receives antimicrobial chemicals to treat incoming condensate.

U.S. Pat. No. 7,740,025 issued to Scaringe discloses a housing containing a biocide therein that is coupled with an A/C condensate line to prevent microbiological growth.

U.S. Pat. No. 7,686,034 issued to Coogle discloses a tubular body for housing a biocide that is coupled with a condensate tray.

U.S. Pat. No. 7,930,898 issued to Laufenberg discloses a pipe that is coupled with a condensate drain line having a port for introducing pressurized liquid or gas.

U.S. Pat. No. 8,475,603 Kaiser issued to Kaiser discloses a condensate sanitizing system comprising a treatment chamber attached to a condensate drain line. A spray assembly projects hot water into the treatment chamber to dislodge sludge.

U.S. published patent application no. 2012/0325333 to Athanasiou discloses a method and an apparatus for cleaning a water line.

U.S. published patent application no. 2014/0075967 to Arensmeier et al. discloses a fitting for a condensate drain line in an A/C unit having numerous sensors that measure water level to determine if a drain line is clogged or if a drain pan is overflowing. If so, a controller disables the A/C unit and transmits one or more alert messages.

As indicated above, numerous devices exist in the prior art that allow a biocide or compressed air to be introduced into a condensate system. However, none of the prior-art devices include a unitary module that sterilizes condensate while automatically acquiring readings from a plurality of sensors that are wirelessly accessible by a remote device, such as a PC or smart phone. Though the publication to Arensmeier discloses a device for disabling an A/C unit if a drain pan is overflowing, the device does not chemically treat condensate nor does it monitor and wirelessly transmit operational data. Finally, none of the chemical treatment devices described above monitor the amount of remaining biocide to alert a remote user if the biocide is nearing depletion.

The present invention overcomes the deficiencies of the prior art by providing a module that is coupled with a condensate drain line, immediately downstream from the drip pan. The module includes a biocidal cartridge that sterilizes incoming condensate, and a load cell for continuously weighing the biocide so that a user can readily determine when it is nearing depletion. A number of sensors measure ambient temperature, pressure and humidity as well as condensate flow rate and condensate levels within the drip pan and housing interior. The controller includes Wi-Fi capability so that a remote supervisor can wirelessly access the various sensor readings and react accordingly. Furthermore, if a condensate overflow condition is detected, the controller automatically disables the air conditioner and transmits a distress signal to the supervisor.

SUMMARY OF THE INVENTION

The present invention relates to a condensate treatment system comprising a housing attached to an A/C condensate drain line having an interior chamber with a biocide received therein. A control unit is in communication with sensors for monitoring condensate flow rate and condensate levels in both the housing and drip pan. If the condensate level in either location is above a predetermined threshold, the control unit disables the air conditioner to prevent an overflow, and wirelessly transmits an alert message to a remote electronic device. Furthermore, a load cell continuously measures the total weight of remaining biocide so that a user can readily determine when the biocide is nearing depletion.

The sensor and load cell readings are also wirelessly accessible by a remote electronic device.

It is therefore an object of the present invention to provide a treatment system for an A/C unit that injects biocide into a condensate drain line while automatically monitoring critical operational variables.

It is another object of the present invention to provide a condensate treatment system for an A/C unit that wirelessly notifies a remote supervisor when a biocidal material is nearing depletion.

It is yet another object of the present invention to provide a condensate treatment system that automatically disables an A/C unit if condensate outflow is inhibited.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
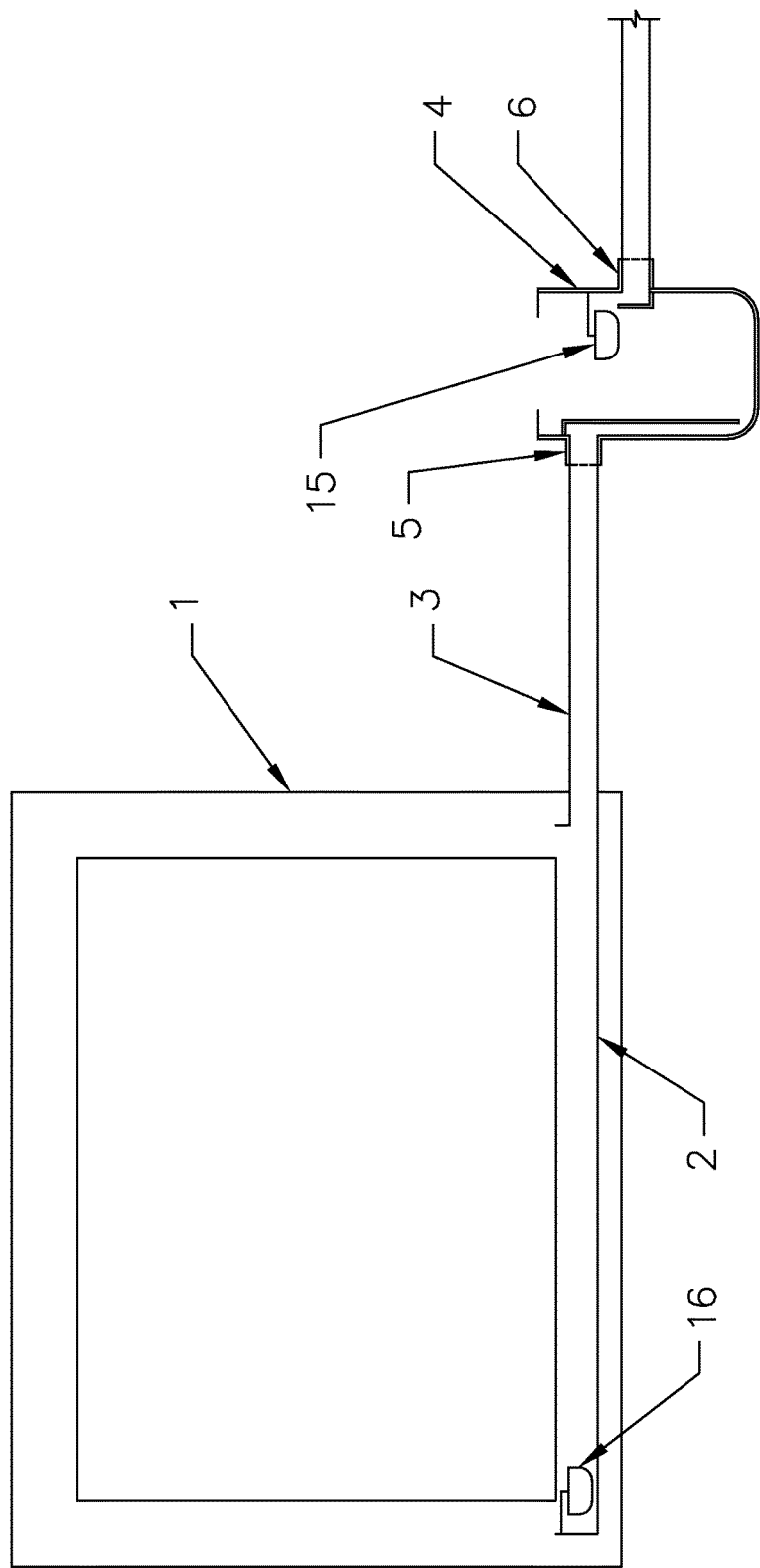
FIG. 1 depicts an exemplary air conditioning system with the treatment module installed therein.
Figure 2:
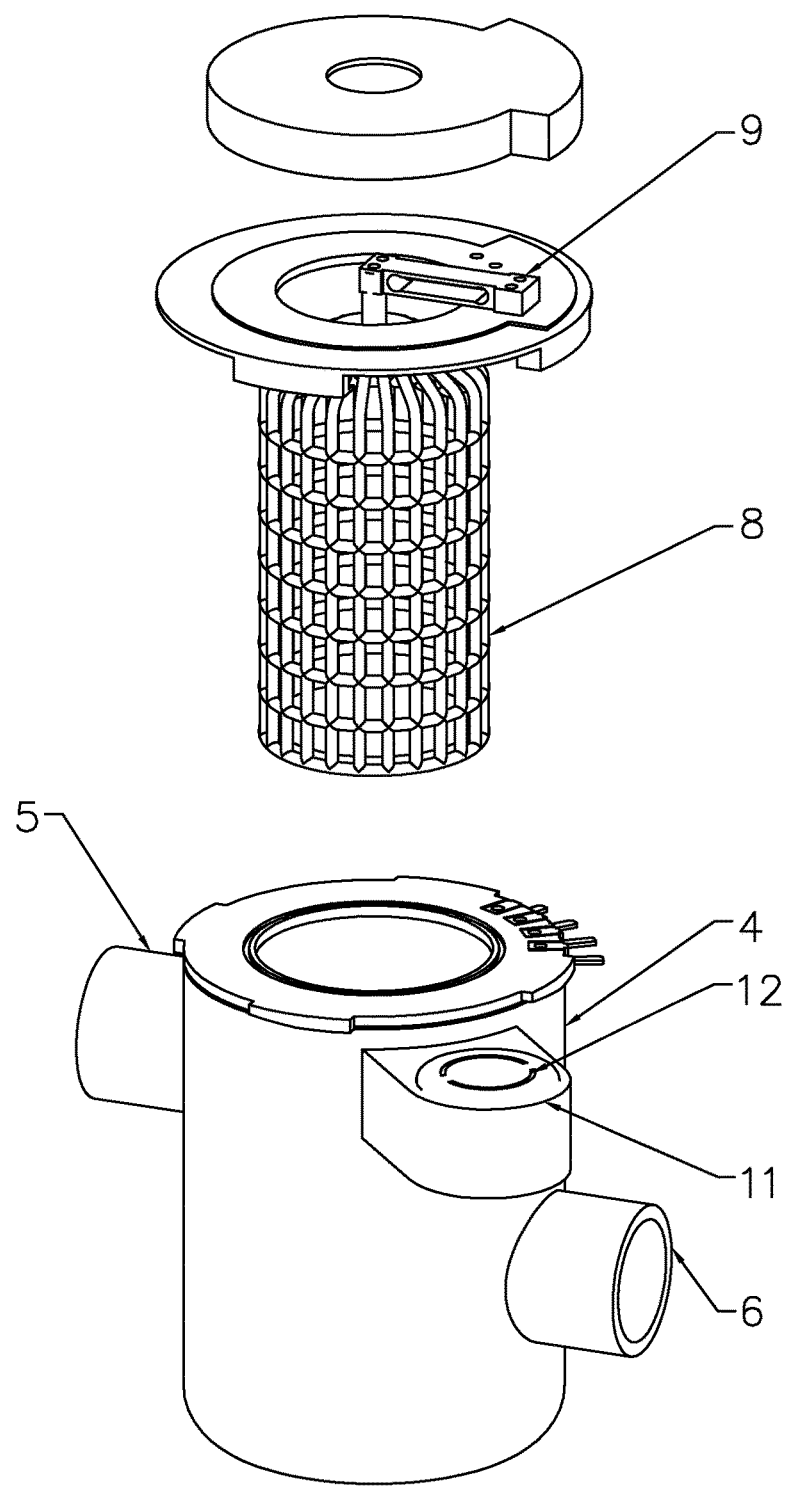
FIG. 2 is an exploded, perspective view of the treatment module according to the present invention.
Figure 5:
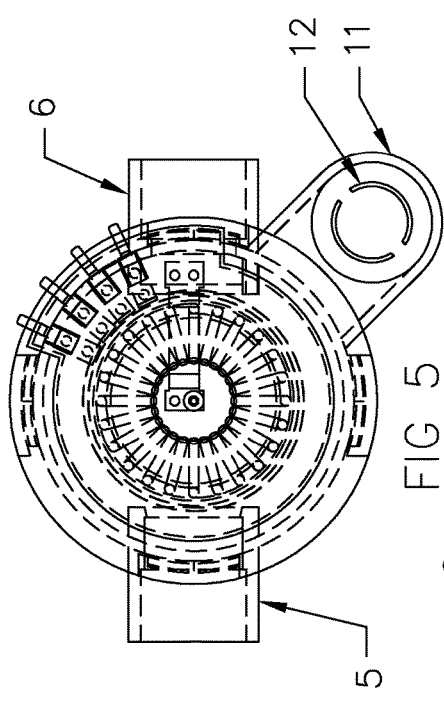
FIG. 5 is a top view of the treatment module.
Figure 4:
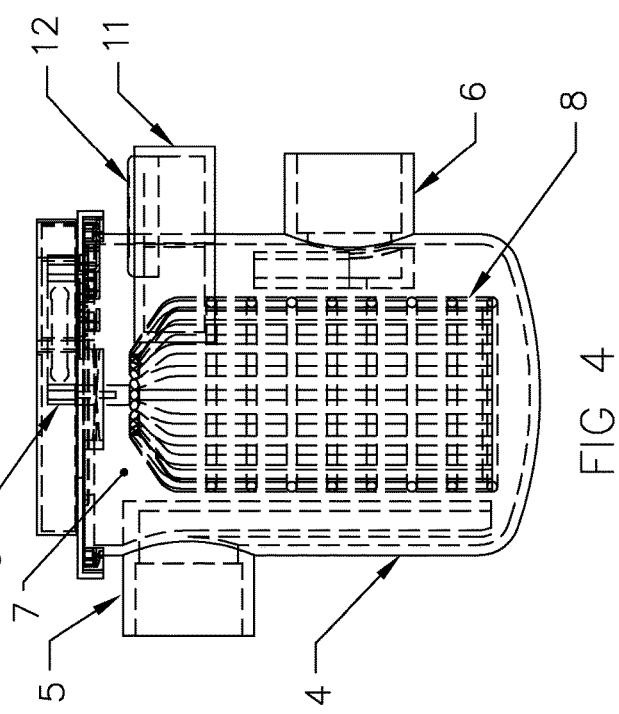
FIG. 4 is a side, sectional view of the module with residual condensate in the interior chamber.
Figure 3:
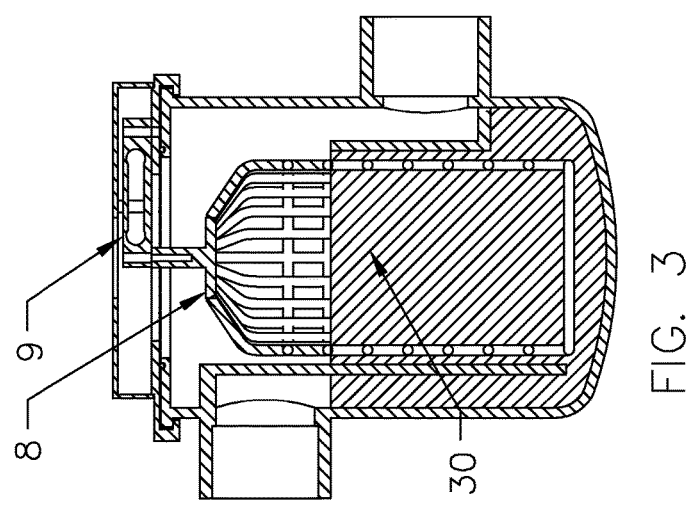
FIG. 3 is a side, sectional view of the module.
Figure 6:
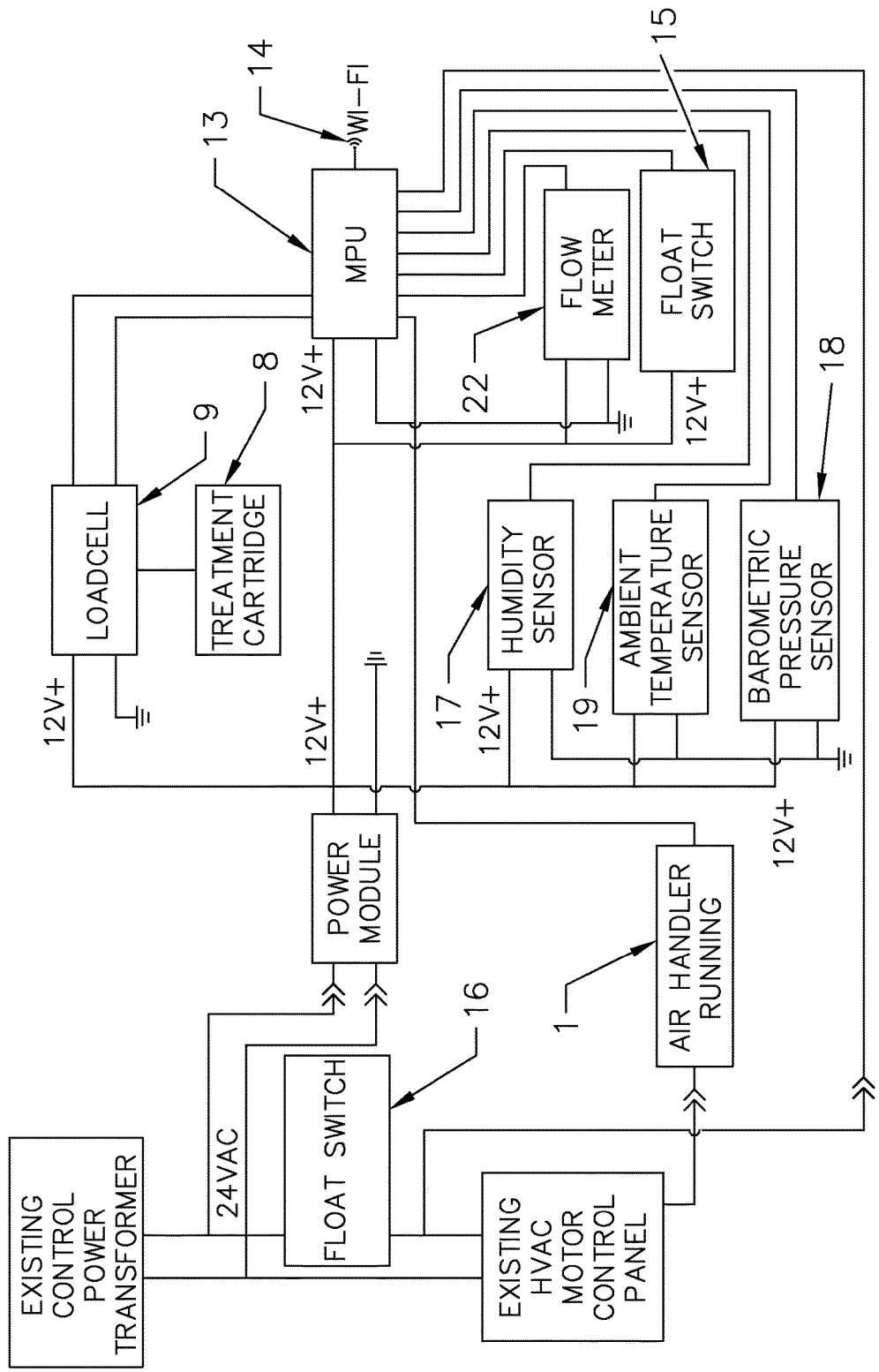
FIG. 6 is a schematic depicting the primary components of the condensate treatment system according to the present invention.

A typical air conditioner unit includes an air handler 1 wherein warm air is cooled by a refrigerant and recirculated to a building interior. As the air is cooled, entrained water vapor condenses and falls onto a drip pan 2 below. A condensate drain line 3 connected to the drip pan 2 transfers the liquid to a municipal sewer.

The present invention relates to a condensate treatment system for a typical air conditioner unit of the type described above. The system includes a treatment module 4 attached to the condensate drain line, immediately downstream from the air-handler drip pan 2. The treatment module is formed of a housing having an inlet 5 and an outlet 6 that are each in fluid communication with an interior chamber 7. The inlet is connected to the section of the condensate line exiting the air handler and the outlet is connected to a remaining section of the line leading to the sewer.

Removably received within the interior chamber is a cylindrical cartridge 8 that is configured to retain a biocide for sterilizing incoming condensate. The interior chamber not only provides a well for pooling and sterilizing residual condensate 30, but it also creates a liquid trap that prevents noxious sewer gases from backing into the air handler, where they could be inadvertently circulated to a building interior. Preferably, the biocide is a dry, water-soluble material, such as tablets or pellets containing Trichlro-S-Triazinetrione, or any other known, similar equivalent. A load cell 9 at an upper end of the housing includes a weight-bearing member that supports the cartridge. The load cell continuously measures the total weight of the cartridge to calculate a remaining biocide supply.

On the housing outer wall is a collar 11 that supports a control unit 12 having a microprocessor 13 with wireless-transmission capabilities to allow communication with remote electronic devices via a Wi-Fi connection. For example, the microprocessor could be a tiny chip, such as that marketed and sold under the trademark SimpleLink CC 3200™, which is purported to be the first, single-chip, programmable MCU having integral Wi-Fi connectivity 14. The control unit preferably includes a camera interface for visually recording a surrounding area or equipment, if desired. Multiple power management components, such as Analog-to-Digital and AC-to-DC converters allow the device to be coupled with a wide range of available power sources, while allowing the use of a hibernate mode to minimize power consumption.

The microprocessor is electrically connected to a plurality of sensors and control hardware for monitoring various operating parameters and initiating corrective action when appropriate. For example, a first float switch 15 in the interior chamber 7, or a second float 16 switch in the drip pan 2, alerts the microprocessor when the condensate level is above a threshold that is indicative of a plugged condensate line. Upon receiving a high level alert from either float switch, the microprocessor engages a relay to disable power to the air conditioner unit and generates an alert message.

A humidity sensor 17, a barometric pressure sensor 18 and an infrared thermometer 19 monitor ambient conditions near the air handler, and the readings are continuously collected and stored by the microprocessor. The environmental sensors allow a supervisor to analyze operational conditions near the air handler and evaluate air conditioner performance or other variables that may be inhibiting performance. For example, the microprocessor can measure temperature in an attic, where most air handlers are located, and compare it with the outdoor temperature obtained from a server, such as the internet. The differential could indicate that an attic ventilator is malfunctioning or that additional ventilation should be created. Furthermore, the measured temperature can allow the supervisor to ultimately determine that an air conditioner unit is not properly sized for a given application.

Measuring the ambient humidity or pressure allows the supervisor to predict the amount of condensate that will be generated in the air handler in order to properly size lines, determine biocide loads or to predict biocide consumption. If the actual condensation production is far less than estimated based upon measured ambient humidity, the supervisor can investigate potential operational problems, such as plugged coils in the air handler. Virtually any number of other environmental sensors can be coupled with the microcontroller to allow a supervisor to analyze and evaluate operational conditions, detect problems and improve performance.

The microprocessor also continuously receives measurements from the load cell to calculate a remaining supply of biocide. A flow meter 22 installed on the condensate drain line informs the microprocessor if condensate flow is significantly reduced or interrupted.

The control unit wirelessly transmits all alert messages via Wi-Fi to an authorized remote electronic device, such as a computer or smart phone. Furthermore, the sensor measurements are wirelessly accessible by the electronic device when desired. Accordingly, a remote supervisor can readily monitor system parameters, such as ambient temperature, pressure and humidity as well as condensate flow rate and current biocide level in the treatment module. If the biocide level is nearing exhaustion, the microprocessor transmits an alert to the supervisor's remote electronic device. If either float switch detects an overflow condition, the microprocessor immediately disables the air conditioner and wirelessly transmits an alert message to the supervisor.

The above-described device is not limited to the exact details of construction and enumeration of parts provided herein. For example, though the ambient sensors are primarily depicted and described as measuring temperature, pressure and humidity, virtually any type of ambient sensor can be used. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A condensate treatment system for an air conditioner comprising:
    a housing coupled with a condensate drain line exiting an air handler, said housing having an interior chamber in fluid communication with said drain line;
    a biocide received within said interior chamber;
    a load cell within said interior chamber, said load cell having a load-bearing member that supports said biocide to measure an amount of biocide within said interior chamber;
    a means for wireless sly informing a remote user of the amount of biocide within said interior chamber, wherein said means for wirelessly informing a remote user of the amount of biocide within said interior chamber comprises a controller in communication with said load cell, said controller having a wireless communication processor for wirelessly transmitting a measurement from said load cell to a remote electronic device;
    a humidity sensor in communication with said controller;
    an infrared thermometer proximal the air handler and in communication with said controller.

2. The condensate treatment system according to claim 1 further comprising an atmospheric pressure sensor, proximal the air handler and in communication with said controller.

3. The condensate treatment system according to claim 1 further comprising a flow meter on said drain line and in communication with said controller for notifying a remote user of a condensate flow rate through said condensate line.

4. The condensate treatment system according to claim 1 further comprising a first fluid-level indicator in the interior chamber of said housing for measuring a first level of residual condensate in said interior chamber, said first fluid-level indicator in communication with said controller, said controller in communication with an air conditioner power source for disabling said air conditioner upon said first level of residual condensate exceeding a predetermined level.

5. The condensate treatment system according to claim 4 further comprising a second fluid-level indicator in an air-handler drip pan for measuring a second level of residual condensate in said drip pan, said second fluid-level indicator in communication with said controller, said controller in communication with the air conditioner power source for disabling said air conditioner upon said second level of residual condensate exceeding a predetermined level.

6. The condensate treatment system according to claim 1 further comprising an outdoor thermometer in communication with said controller, said controller comparing said outdoor temperature with a measurement received from said infrared thermometer to monitor operating conditions near the air handler.

7. The condensate treatment system according to claim 1 wherein said controller is mounted on an outer wall of said housing.

8. A condensate treatment system for an air conditioner comprising:
    a housing coupled with a condensate drain line exiting an air handler, said housing having an interior chamber in fluid communication with said drain line;
    a biocide received within said interior chamber;
    a load cell within said interior chamber, said load cell having a load-bearing member that supports said biocide to measure an amount of biocide within said interior chamber;
    a means for wireless sly informing a remote user of the amount of biocide within said interior chamber, wherein said means for wirelessly informing a remote user of the amount of biocide within said interior chamber comprises a controller in communication with said load cell, said controller having a wireless communication processor for wirelessly transmitting a measurement from said load cell to a remote electronic device;
    a humidity sensor in communication with said controller;
    an atmospheric pressure sensor, proximal the air handler and in communication with said controller.

9. An air conditioning condensate treatment system comprising:
    an air conditioner including air handler wherein warm air is cooled by a refrigerant;
    a drip pan below said refrigerant for collecting condensate;
    a drain line connected to said drip pan for transferring the condensate to a waste source;
    a housing having an interior chamber in fluid communication with said condensate drain line;
    a biocide received within said interior chamber;
    a means for disabling said air conditioner when a condensate level in either of said drip pan and said interior chamber exceeds a predetermined threshold;
    a measuring means for determining an amount of said biocide in said interior chamber;
    a means for wirelessly informing a remote user of the amount of said biocide in said interior chamber, wherein said means for wirelessly informing a remote user of the amount of said biocide in said interior chamber comprises a controller in communication with said measuring means, said controller having a Wi-Fi processor for wirelessly transmitting a reading from said measuring means to a remote electronic device;
    said controller further including a camera interface for visually recording a surrounding area or equipment.

10. The air conditioning condensate treatment system according to claim 9 wherein said means for disabling said air conditioner when a condensate level in either of said drip pan and said interior chamber exceeds a predetermined threshold comprises:
    a first fluid-level indicator in said drip pan;
    a second fluid-level indicator in said interior chamber;
    said controller electrically connected to said first fluid-level indicator, said second fluid-level indicator and said air conditioner.

11. The condensate treatment system according to claim 9 further comprising a sensor in communication with said controller for measuring a critical parameter associated with said air conditioner.

12. The condensate treatment system according to claim 11 wherein said sensor is selected from the group consisting of:
- a pressure sensor;
- a humidity sensor;
- a temperature sensor; and
- a condensate flow-rate sensor mounted on said drain line.

* * * * *